US012638168B2

(12) United States Patent
Hamano

(10) Patent No.: US 12,638,168 B2
(45) Date of Patent: May 26, 2026

(54) ILLUMINATION DEVICE

(71) Applicant: Japan Display Inc., Tokyo (JP)

(72) Inventor: Daisuke Hamano, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/070,774

(22) Filed: Mar. 5, 2025

(65) Prior Publication Data

US 2025/0198611 A1 Jun. 19, 2025

Related U.S. Application Data

(63) Continuation of application No. PCT/JP2023/026746, filed on Jul. 21, 2023.

(30) Foreign Application Priority Data

Sep. 7, 2022 (JP) ................................ 2022-142037

(51) Int. Cl.

*F21V 29/77* (2015.01)
*F21V 14/00* (2018.01)
*F21V 19/00* (2006.01)
*F21V 23/00* (2015.01)

(52) U.S. Cl.

CPC .......... *F21V 29/773* (2015.01); *F21V 14/003* (2013.01); *F21V 19/003* (2013.01); *F21V 23/003* (2013.01)

(58) Field of Classification Search

CPC .... F21V 29/773; F21V 14/003; F21V 19/003; F21V 23/003

See application file for complete search history.

(56) References Cited

U.S. PATENT DOCUMENTS

| | | | | | |
|---|---|---|---|---|---|
| 5,798,864 | A | 8/1998 | Sekiguchi | | |
| 8,104,926 | B2 * | 1/2012 | Wang | F21V 29/89 | 362/240 |
| 2009/0129102 | A1 * | 5/2009 | Xiao | F21V 29/83 | 362/373 |
| 2010/0259934 | A1 * | 10/2010 | Liu | F21K 9/233 | 362/373 |
| 2011/0037368 | A1 * | 2/2011 | Huang | F21V 29/507 | 313/46 |
| 2013/0294085 | A1 * | 11/2013 | Watanabe | B29C 45/14467 | 264/261 |

(Continued)

FOREIGN PATENT DOCUMENTS

| | | | |
|---|---|---|---|
| JP | H07-261125 | A | 10/1995 |
| JP | 2021-166200 | A | 10/2021 |
| JP | 2021-197357 | A | 12/2021 |

OTHER PUBLICATIONS

Search Report issued in International Patent Application No. PCT/JP2023/026746, mailed on Sep. 19, 2023 and English translation of same. 5 pages.

(Continued)

*Primary Examiner* — Bryon T Gyllstrom
(74) *Attorney, Agent, or Firm* — K&L Gates LLP

(57) ABSTRACT

An illumination device includes: a heat sink; a light source disposed on one side of the heat sink in a first direction and configured to be cooled by the heat sink; an optical member disposed on the one side of the light source in the first direction; and a first attachment member attaching the light source and the optical member to the heat sink.

4 Claims, 9 Drawing Sheets

(56) References Cited

U.S. PATENT DOCUMENTS

| | | | | |
|---|---|---|---|---|
| 2014/0140053 | A1* | 5/2014 | Liu | F21V 17/10<br>362/231 |
| 2022/0325857 | A1* | 10/2022 | David | F21V 29/507 |

OTHER PUBLICATIONS

Office Action issued in related Japanese Patent Application No. 2024-545482, mailed on Feb. 17, 2026 and English translation of same. 6 pages.

* cited by examiner

ILLUMINATION DEVICE

CROSS-REFERENCE TO RELATED APPLICATIONS

This application claims the benefit of priority from Japanese Patent Application No. 2022-142037 filed on Sep. 7, 2022 and International Patent Application No. PCT/JP2023/026746 filed on Jul. 21, 2023, the entire contents of which are incorporated herein by reference.

BACKGROUND

1. Technical Field

The present disclosure relates to an illumination device.

2. Description of the Related Art

An illumination device including a light source, a heat sink, and a reflector is publicly known (refer to Japanese Patent Application Laid-open Publication No. 2021-166200 and Japanese Patent Application Laid-open Publication No. 2021-197357, for example). The light source is cooled with the heat sink, and light from the light source is reflected by the reflector in a direction along the optical path of incident light. A large number of attachment members are needed to assemble the light source, the heat sink, the reflector, and the like as components of the illumination device.

To add a further function to the illumination device, another member such as a lens or a cover is attached in some cases. In such a case, not only the number of components increases but also loads concentrates on one attachment member depending on the manner of attachment of the additional member, and thus the stiffness or the like of the attachment member needs to be improved, which results in increase in the size of the illumination device as a whole, and this is not preferable.

SUMMARY

There is a need for providing an illumination device in which load concentration on a particular attachment member is prevented when there is a plurality of attachment members to which components are attached.

According to an aspect, an illumination device includes: a heat sink; a light source disposed on one side of the heat sink in a first direction and configured to be cooled by the heat sink; an optical member disposed on the one side of the light source in the first direction; and a first attachment member attaching the light source and the optical member to the heat sink.

DETAILED DESCRIPTION

In the related art, an illumination device in which load concentration on a particular attachment member is prevented when there is a plurality of attachment members to which components of the illumination device are attached is desired.

An aspect (embodiment) of the present disclosure will be described below in detail with reference to the accompanying drawings. Contents described below in the embodiment do not limit the present disclosure. Components described below include those that could be easily thought of by the skilled person in the art and those identical in effect. Components described below may be combined as appropriate.

What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

Figure 1:
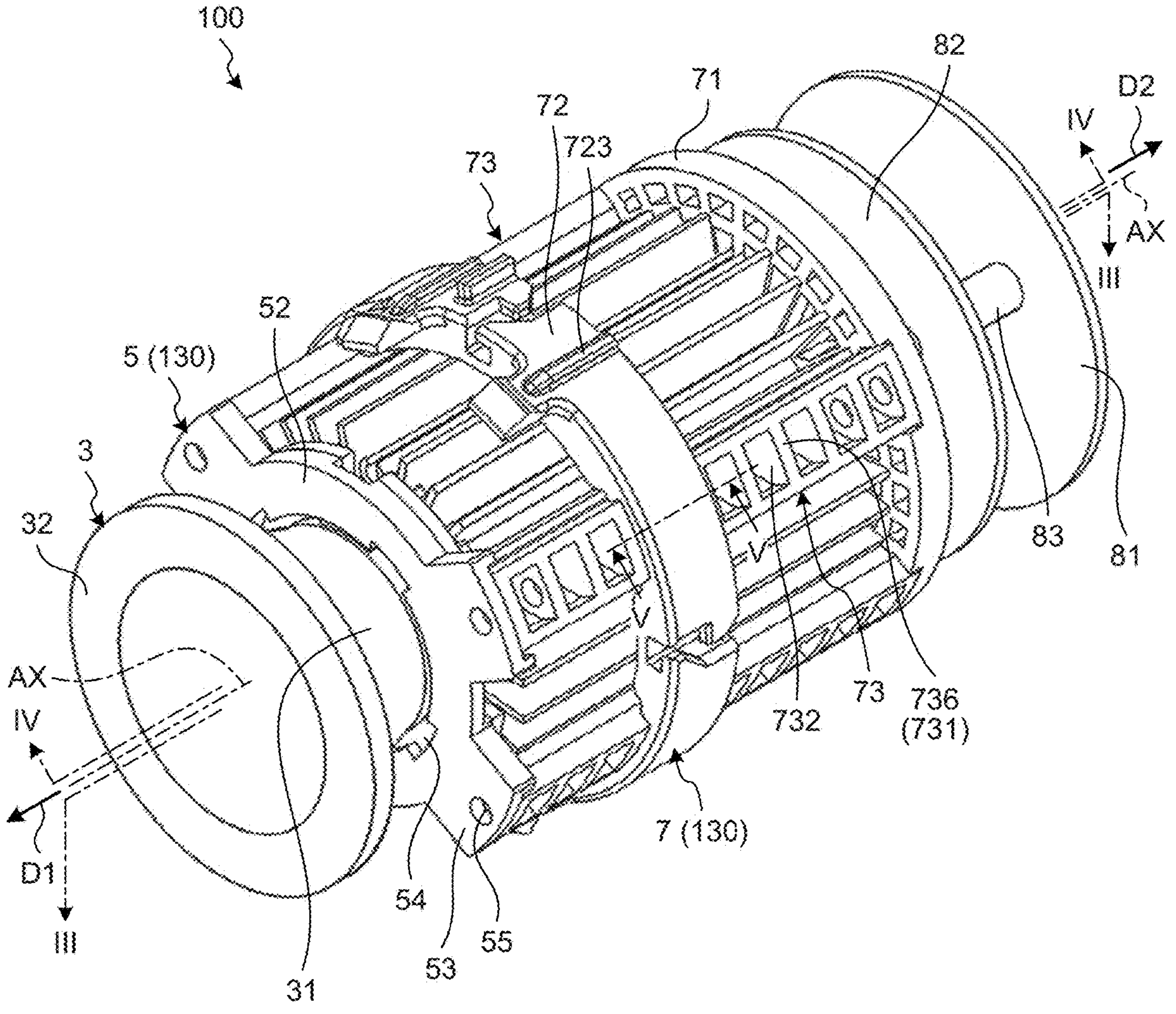
FIG. 1 is a schematic perspective view of an illumination device according to an embodiment.
Figure 2:
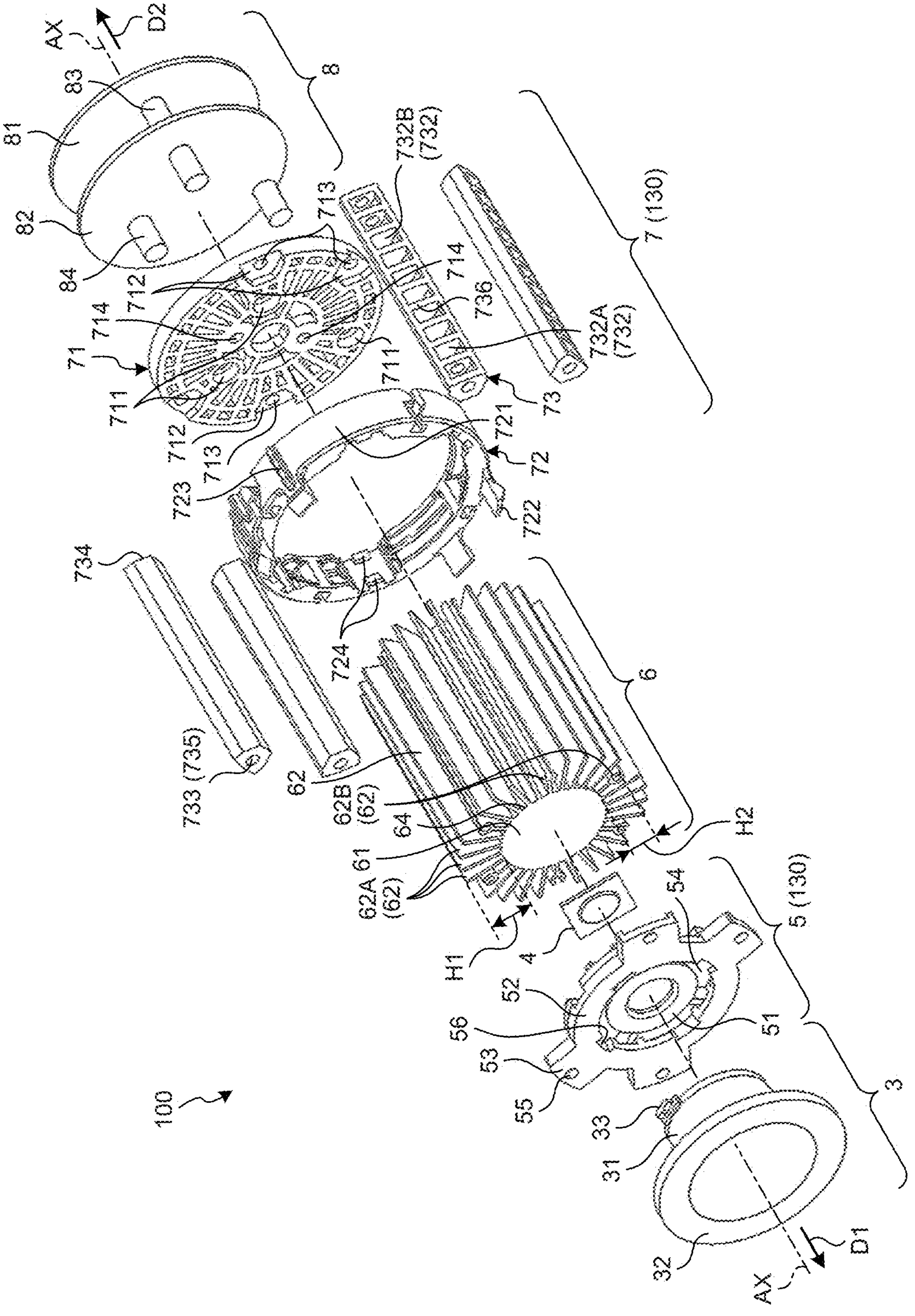
FIG. 2 is an exploded perspective view of FIG. 1.
Figure 3:
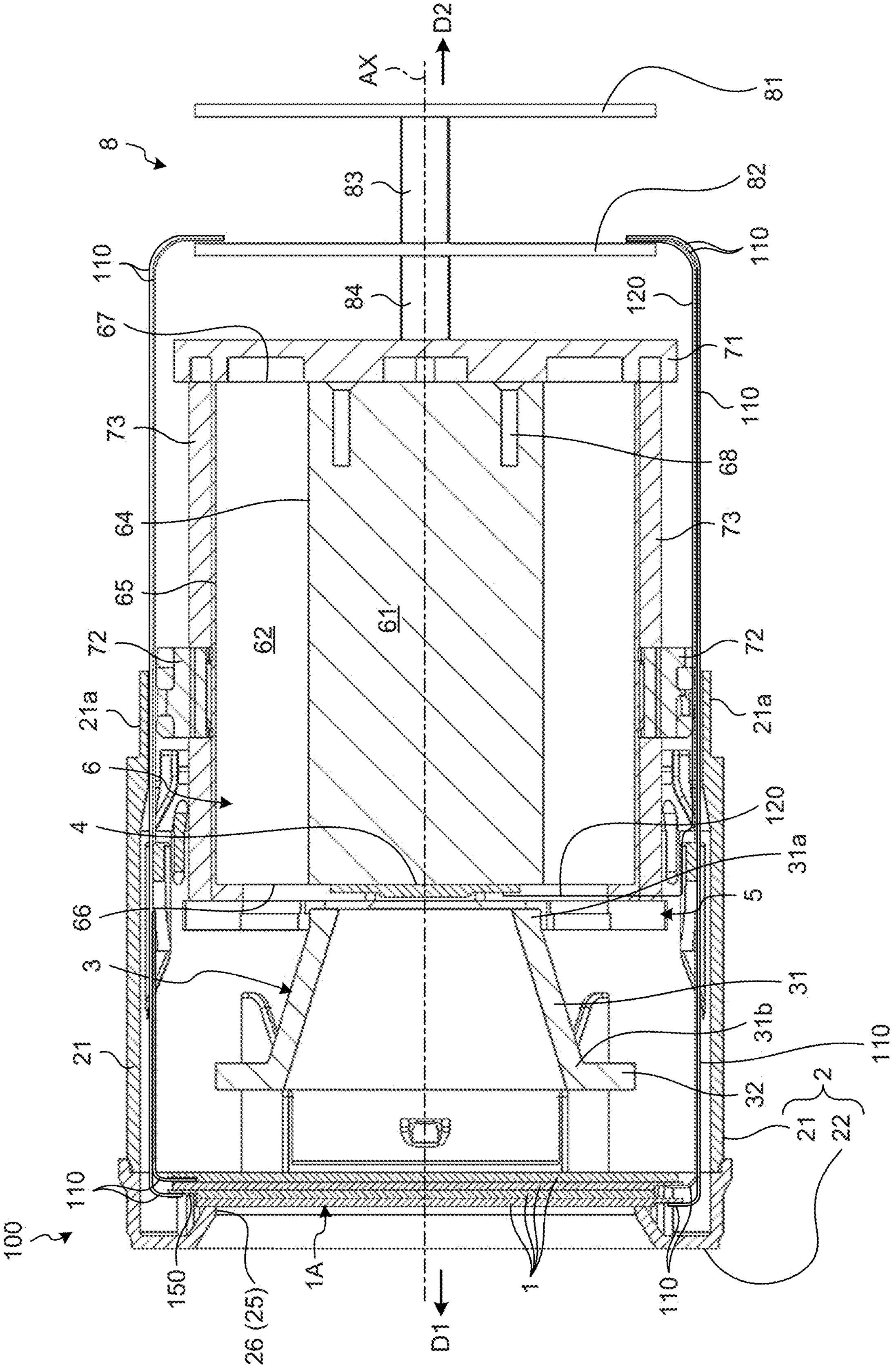
FIG. 3 is a schematic sectional view along line III-III in FIG. 1.
Figure 4:
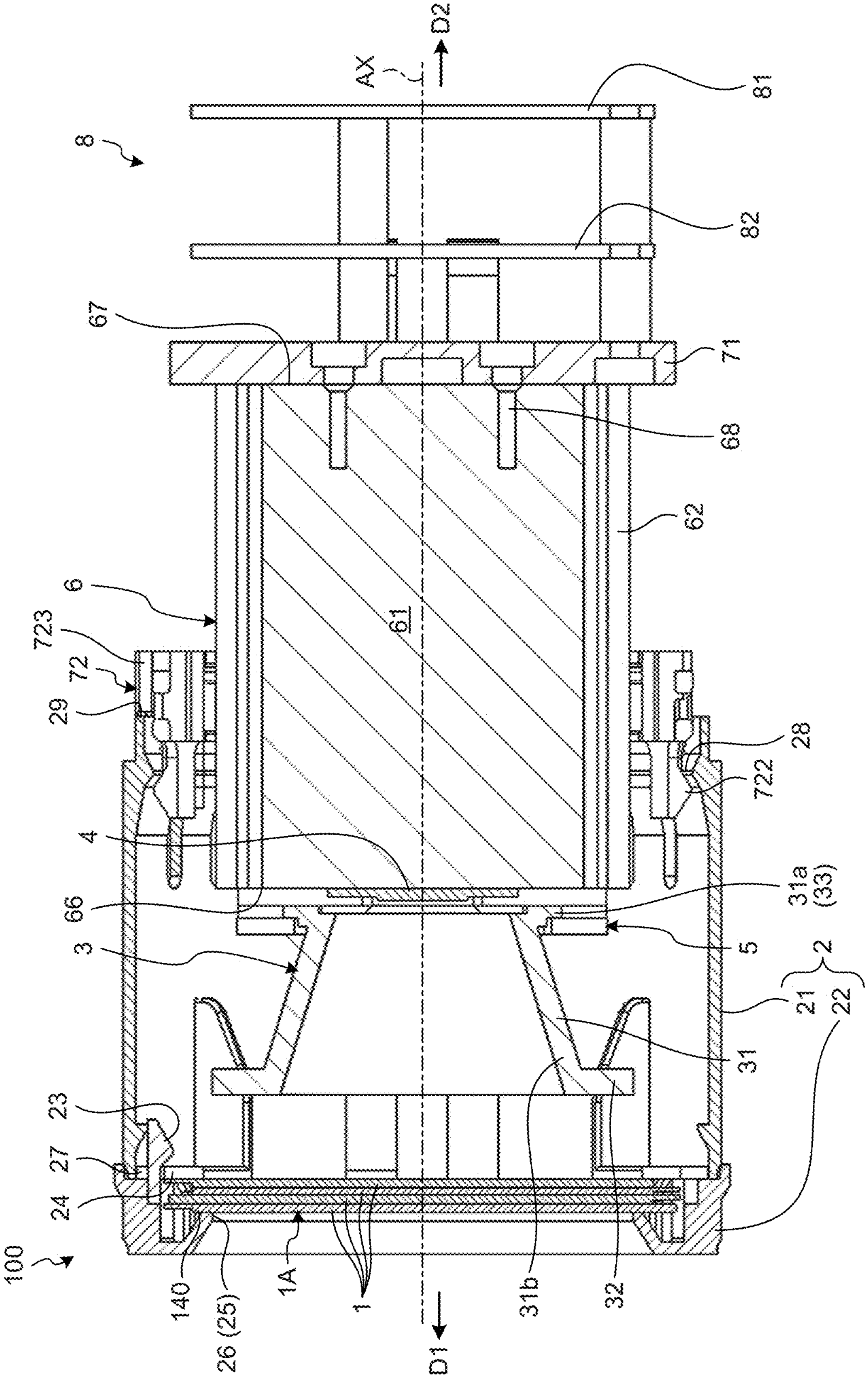
FIG. 4 is a schematic sectional view along line IV-IV in FIG. 1.
Figure 5:
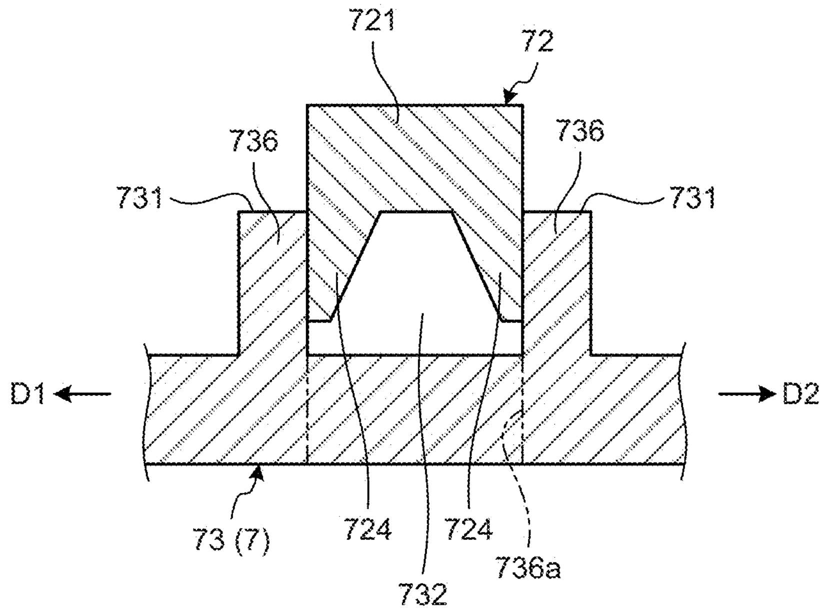
FIG. 5 is a schematic sectional view along line V-V in FIG. 1.

First, the structure of an illumination device according to an embodiment will be described below. FIG. 1 is a schematic perspective view of the illumination device according to the embodiment. FIG. 2 is an exploded perspective view of FIG. 1. FIG. 3 is a schematic sectional view along line III-III in FIG. 1. FIG. 4 is a schematic sectional view along line IV-IV in FIG. 1. FIG. 5 is a schematic sectional view along line V-V in FIG. 1.

As illustrated in FIGS. 1 to 4, an illumination device 100 includes an optical element 1A, a holder (second attachment member) 2, a reflector (optical member) 3, an LED (light source) 4, a second holder (first attachment member) 5, a heat sink 6, a base member (first attachment member) 7, a control board 8, and an FPC (wiring) 110, and these components are disposed in the axial direction of a central axis AX. The second holder 5 and the base member 7 are also referred to as the first attachment members, and the holder 2 is also referred to as the second attachment member. The axial direction is also referred to as a first direction, one side in the axial direction is a D1 side (one side in the first direction), and the other side in the axial direction is a D2 side (the other side in the first direction).

The optical element 1A includes a plurality of liquid crystal panels 1. The liquid crystal panels 1 have thin flat plate shapes, and for example, four liquid crystal panels 1 overlap in the axial direction. In other words, the optical element 1A in the present embodiment includes four liquid crystal panels 1 overlapping in the axial direction. The number of liquid crystal panels 1 is not particularly limited. The liquid crystal panels 1 are alternately stacked in the axial direction as a liquid crystal panel for p-wave polarization and a liquid crystal panel for s-wave polarization. As illustrated in FIGS. 3 and 4, the liquid crystal panels 1 are assembled in the holder 2. The configuration of each liquid crystal panel 1 will be described later in detail.

As illustrated in FIGS. 3 and 4, the holder 2 includes a body part 21 and a fitting member 22. The fitting member 22 is positioned on the D1 side, which is the one side in the axial direction, of the body part 21. The fitting member 22 includes a holding piece 26 on the D1 side. The inner periphery side of the holding piece 26 is an opening part 25. The fitting member 22 includes a click part 23 on the D1 side. A plurality of click parts 23 are provided in the circumferential direction about the central axis AX. The body part 21 has a tubular shape, a support member 24 is provided at its end part on the D1 side, and a protrusion part 28 is provided at its end part on the D2 side. The support member 24 extends inward in the radial direction, and a fitting groove 27 is provided at an outer part of the support member 24 in the radial direction. The fitting member 22 is attached to the body part 21 by fitting the click parts 23 to the fitting groove 27. An outer peripheral end part 140 of each liquid crystal panel 1 is sandwiched between the support member 24 and the holding piece 26. Accordingly, the four liquid crystal panels 1 are attached to the holder 2. Then, the holder 2 is attached to the base member 7 by fitting the protrusion part 28 of the body part 21 to a click part 722 of a first holder 72 of the base member 7 to be described later.

As illustrated in FIGS. 1 to 4, the reflector 3 includes a body part 31, a flange 32, and a protrusion 33. The reflector 3 is positioned on the D1 side against the LED 4. The body part 31 has a tubular shape. Specifically, the body part 31 has a tubular shape with a radius that increases as the position moves toward the D1 side from an end part 31*a* to an end part 31*b*. At the end part 31*b*, the flange 32 extends outward in the radial direction. The protrusion 33 is provided at the end part 31*a* of the body part 31. The protrusion 33 protrudes outward in the radial direction. The protrusion 33 is fitted to a groove 56 of an outer annular part 52 of the second holder 5 to be described later. Accordingly, the reflector 3 is attached to the second holder 5. The reflector 3 is a reflection plate that reflects light from the LED 4 as a light source and guides the light to the liquid crystal panels 1 by reflection. In the present disclosure, optical members other than the reflector 3, such as lenses, are applicable.

As illustrated in FIGS. 1 to 4, the second holder 5 includes an inner annular part 51, the outer annular part 52, and a coupling part 54. The second holder 5 is fastened to an end part of an elongated member 73 on the D1 side through a bolt. The inner annular part 51 is disposed on the D2 side in the second holder 5, the outer annular part 52 is disposed on the D1 side in the second holder 5, and the inner annular part 51 is integrated with the outer annular part 52 through the coupling part 54. A protrusion part 53 protruding outward in the radial direction is provided at the outer annular part 52. A through-hole 55 is provided at the protrusion part 53. The inner annular part 51 and the outer annular part 52 are disposed with an interval therebetween in the axial direction. Thus, the protrusion 33 is fitted between the inner annular part 51 and the outer annular part 52 by rotating the reflector 3 after the protrusion 33 of the reflector 3 is inserted into the groove 56 of the second holder 5, and accordingly, the reflector 3 is attached to the second holder 5 as described above. The reflector 3 is disposed on the D1 side of the second holder 5, and the LED 4 is disposed on the D2 side of the second holder 5. In other words, the second holder 5 is disposed between the LED 4 and the reflector 3 in the axial direction.

The light emitting diode (LED) 4 is a light source. Various kinds of light sources other than an LED are applicable. The LED 4 is disposed on the D1 side of the heat sink 6. The LED 4 is disposed between the second holder 5 and the heat sink 6. Specifically, the LED 4 is sandwiched and held by the second holder 5 and the heat sink 6. The LED 4 is cooled by the heat sink 6.

The heat sink 6 is disposed on the D2 side of the second holder 5. The heat sink 6 extends in the axial direction. The heat sink 6 includes a body part 61 and fins 62. The heat sink 6 is made of, for example, metal. The body part 61 is a cylindrical body extending in the axial direction from an axial direction end 66 to an axial direction end 67. The axial direction end 66 contacts the LED 4. The fins 62 are provided on an outer peripheral surface 64 of the body part 61. The fins 62 protrude outward in the radial direction from the outer peripheral surface 64 of the body part 61. The fins 62 extend in the axial direction (first direction). The fins 62 are disposed at equal intervals in the circumferential direction on the entire circumference of the outer peripheral surface 64 of the body part 61.

As illustrated in FIG. 2, the fins 62 include first fins 62A and second fins 62B. The first fins 62A have a first height H1 from the outer peripheral surface of the body part 61. The second fins 62B have a second height H2 from the outer peripheral surface of the body part 61. The second height H2 is less than the first height H1. The elongated member 73 is disposed outside the second fins 62B in the radial direction.

The base member 7 includes a third holder 71, the first holder 72, and a plurality of elongated members 73. The third holder 71 includes through-holes 714, through-holes 711, concave grooves 712, and through-holes 713. A pair of through-holes 714 are provided on the inner side of the third holder 71 in the radial direction. The through-holes 714 of the third holder 71 correspond to bolt holes 68 of the heat sink 6. The third holder 71 is attached to the axial direction end 67 of the heat sink 6 by inserting and fastening bolts into the through-holes 714 and the bolt holes 68. The first holder 72 is provided on the outer periphery of the heat sink 6 and extends in the circumferential direction of the heat sink 6. The first holder 72 has a ring shape (annular shape) extending in a direction about the central axis AX.

Four elongated members 73 are assembled on the inner side of the first holder 72. Each elongated member 73 extends in the axial direction. The elongated member 73 extends in the axial direction outside the heat sink 6. A bolt hole 735 is provided at an axial direction end part 733 of the elongated member 73 on the D1 side, and a bolt hole is provided at an axial direction end part 734 of the elongated member 73 on the D2 side. A plurality of wall parts 736 are disposed at equal intervals in the axial direction outside the elongated member 73 in the radial direction. Recessed parts 732 that are recessed inward in the radial direction from an outer peripheral surface 731 are each provided between two wall parts 736 adjacent to each other in the axial direction.

The first holder 72 includes an annular body 721, the click part 722, an extended part 723, and protrusions 724. The annular body 721 is provided annularly in the circumferential direction about the central axis AX. The inner peripheral surface of the annular body 721 contacts outer ends 65 of the fins 62 in the radial direction. The click part 722 protrudes toward the D1 side from the end face of the annular body 721 on the D1 side. As described above, the protrusion part 28 of the body part 21 is fitted to the click part 722. The extended part 723 extends in the axial direction. As illustrated in FIG. 4, the extended part 723 is fitted to a groove 29 of the body part 21. Accordingly, positioning of the first holder 72 and the body part 21 in the circumferential direction is performed. The protrusions 724 protrude inward in the radial direction from the inner peripheral surface of the annular body 721.

As illustrated in FIG. 5, the protrusions 724 are fitted to the recessed parts 732 of each elongated member 73. In other words, the protrusions 724 are externally fitted in contact with wall surfaces of the pair of wall parts 736 of each elongated member 73. Accordingly, positioning of the first holder 72 relative to each elongated member 73 in the axial direction is performed. As illustrated in FIG. 2, predetermined recessed parts among the recessed parts 732 are referred to as a first recessed part 732A and a second recessed part 732B. The second recessed part 732B is positioned on the D2 side relative to the first recessed part 732A. The distance from the LED 4 to the liquid crystal panels 1 in the axial direction when the protrusions 724 are fitted to the first recessed part 732A is referred to as a first distance. The distance from the LED 4 to the liquid crystal panel 1 in the axial direction when the protrusions 724 are fitted to the second recessed part 732B is referred to as a second distance. The first distance is longer than the second distance. As illustrated with dashed and double-dotted lines in FIG. 5, a through-hole 736*a* may be formed through a bottom part of each recessed part.

The bolt hole 735 provided at the axial direction end part 733 of each elongated member 73 on the D1 side corresponds to the through-hole 55 of the protrusion part 53 of the second holder 5. The second holder 5 is fastened to the elongated member 73 by aligning the bolt hole 735 and the through-hole 55 face-to-face and then inserting and fastening a bolt into the bolt hole 735 and the through-hole 55. The axial direction end part 734 that is an end part of the elongated member 73 on the D2 side is fitted to the concave groove 712 of the third holder 71. The third holder 71 is fastened to the elongated member 73 by inserting and fastening a bolt into the through-hole 713 and the bolt hole of the axial direction end part 734. Accordingly, the relative position of the elongated member 73 to the heat sink 6 in the axial direction is fixed.

The control board 8 includes a first substrate 81 and a second substrate 82. The first substrate 81 and the second substrate 82 each have a circular disk shape. The second substrate 82 is positioned on the D1 side relative to the first substrate 81. The first substrate 81 and the second substrate 82 are coupled to each other through three spacers 83. Three spacers 84 are attached on the D1 side of the second substrate 82. The second substrate 82 is attached to the third holder 71 by inserting and fitting distal end parts of the spacers 84 on the D1 side into the through-holes 711 of the third holder 71. The first substrate 81 and the second substrate 82 may be integrated as a single component.

As illustrated in FIG. 3, terminals on the second substrate 82 are electrically coupled to terminal parts 150 of the liquid crystal panels 1 through four FPCs 110 extending in the axial direction. One FPC 110 is electrically coupled to the terminal part 150 of each of the four liquid crystal panels 1 provided. Specifically, two of the four FPCs 110 are disposed at upper sites illustrated in FIG. 3 among sites of the illumination device 100, extend from the terminals on the second substrate 82 toward the D1 side, which is the one side in the axial direction, pass through the gap between the first holder 72 and an end part 21*a* of the body part 21, and then are coupled to the terminal parts 150 of the second and fourth liquid crystal panels 1 from the D1 side among the four liquid crystal panels 1. The remaining two of the four FPCs 110 are disposed at lower sites illustrated in FIG. 3 among sites of the illumination device 100, extend from the terminals on the second substrate 82 toward the D1 side, which is the one side in the axial direction, pass through the gap between the first holder 72 and the end part 21*a* of the body part 21, and then are coupled to the terminal parts 150 of the first and third liquid crystal panels 1 from the D1 side among the four liquid crystal panels 1. When voltage is applied to the liquid crystal panels 1 through the FPCs 110, the orientation of liquid crystal molecules changes and optical properties change. The first substrate 81 is electrically coupled to a power source of the entire illumination device 100. The terminals on the second substrate 82 are electrically coupled to the LED 4 through wiring 120 extending in the axial direction. Specifically, the wiring 120 extend from the terminals on the second substrate 82 toward the D1 side, which is the one side in the axial direction, pass through the gap between the first holder 72 and the end part 21*a* of the body part 21, and then are coupled to the LED 4. In this manner, since the FPCs 110 and the wiring 120 pass through the gap between the first holder 72 and the end part 21*a* of the body part 21, they are prevented from moving in the radial direction intersecting the central axis AX, and for example, prevented from being disposed protruding outside the holder 2.

The following describes the configuration of each liquid crystal panel 1. The front side of the liquid crystal panel 1 is the one side in the axial direction (the D1 side or the one side in the first direction), and the back side of the liquid crystal panel 1 is the other side in the axial direction (the D2 side or the other side in the first direction). In an XYZ coordinate system illustrated in FIGS. 6 to 9, the X direction is orthogonal to the Y direction. An X1 side is opposite an X2 side, and a Y1 side is opposite a Y2 side. The Z direction is orthogonal to the X and Y directions. A Z1 side is opposite a Z2 side. The Z direction is also referred to as the axial direction (first direction). The Z1 side is the D1 side, and the Z2 side is the D2 side.

Figure 6:
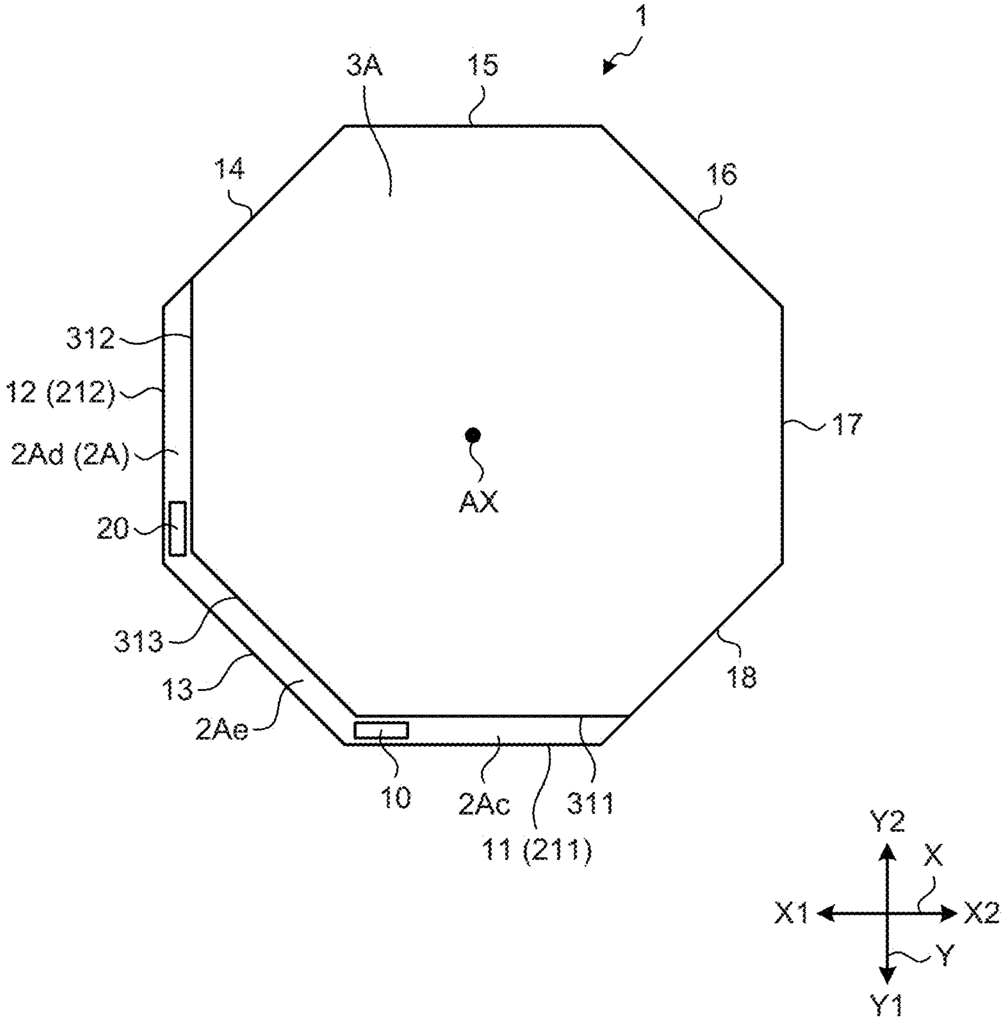
FIG. 6 is a schematic diagram of a liquid crystal panel when viewed from the front side.
Figure 7:
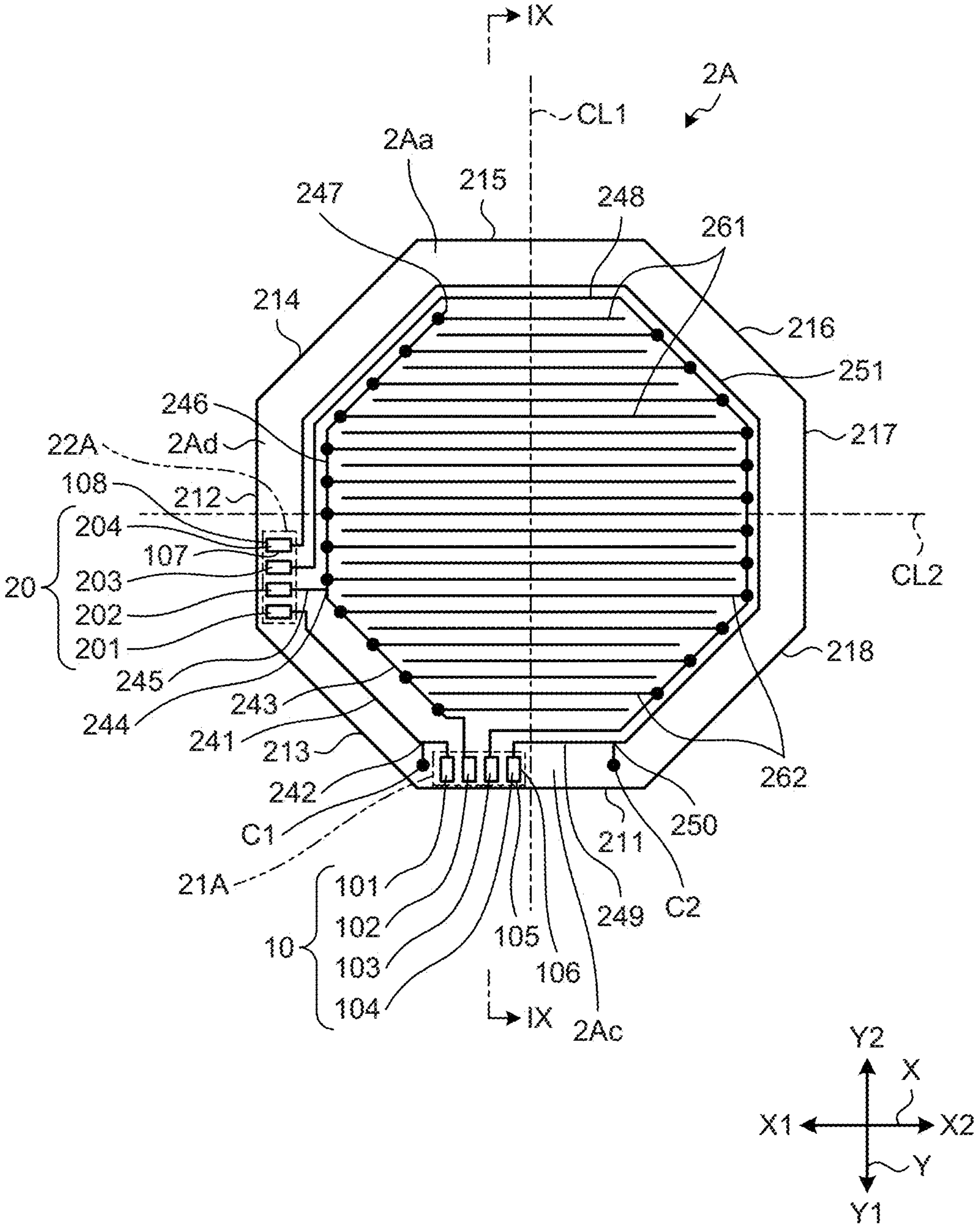
FIG. 7 is a schematic diagram illustrating the front surface of a first substrate included in the liquid crystal panel.
Figure 8:
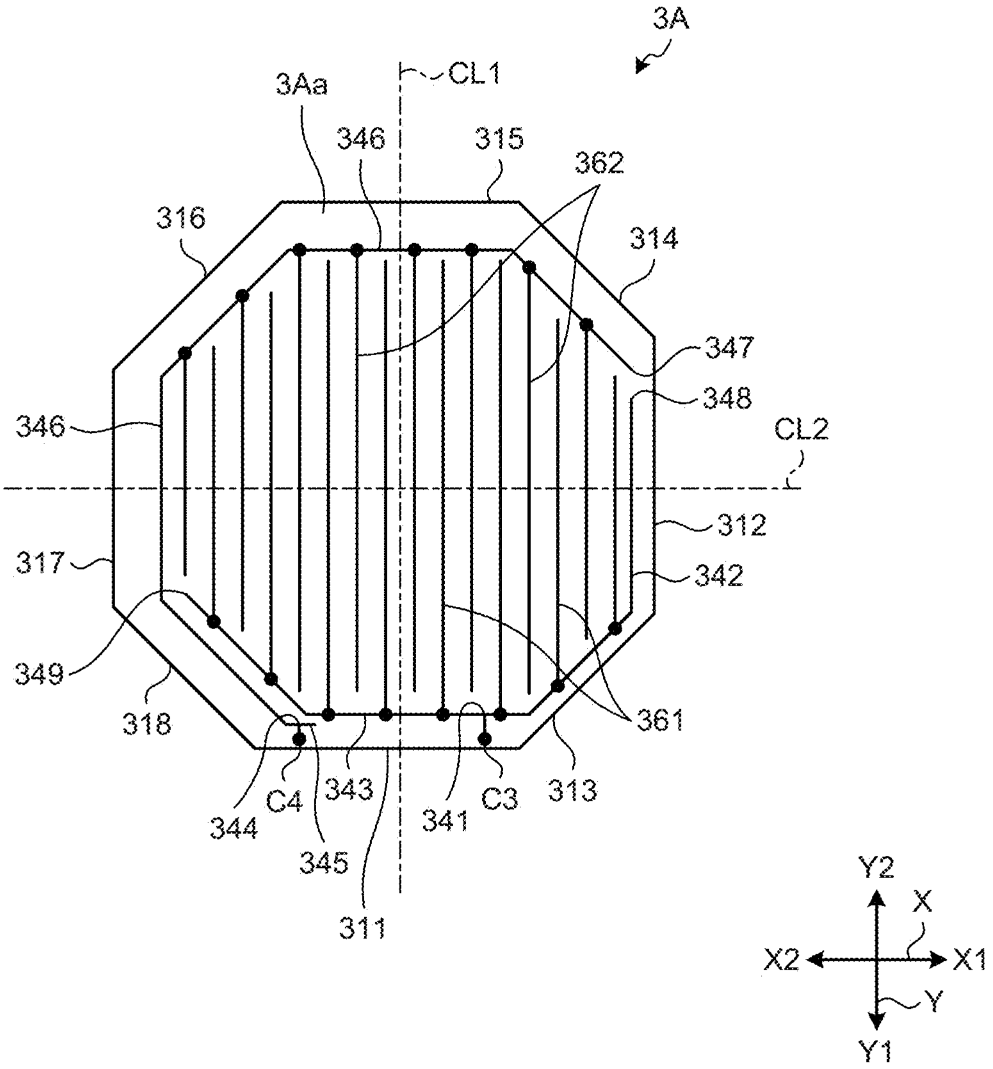
FIG. 8 is a schematic diagram of a second substrate included in the liquid crystal panel when turned over, illustrating its front surface on which wiring is provided.
Figure 9:
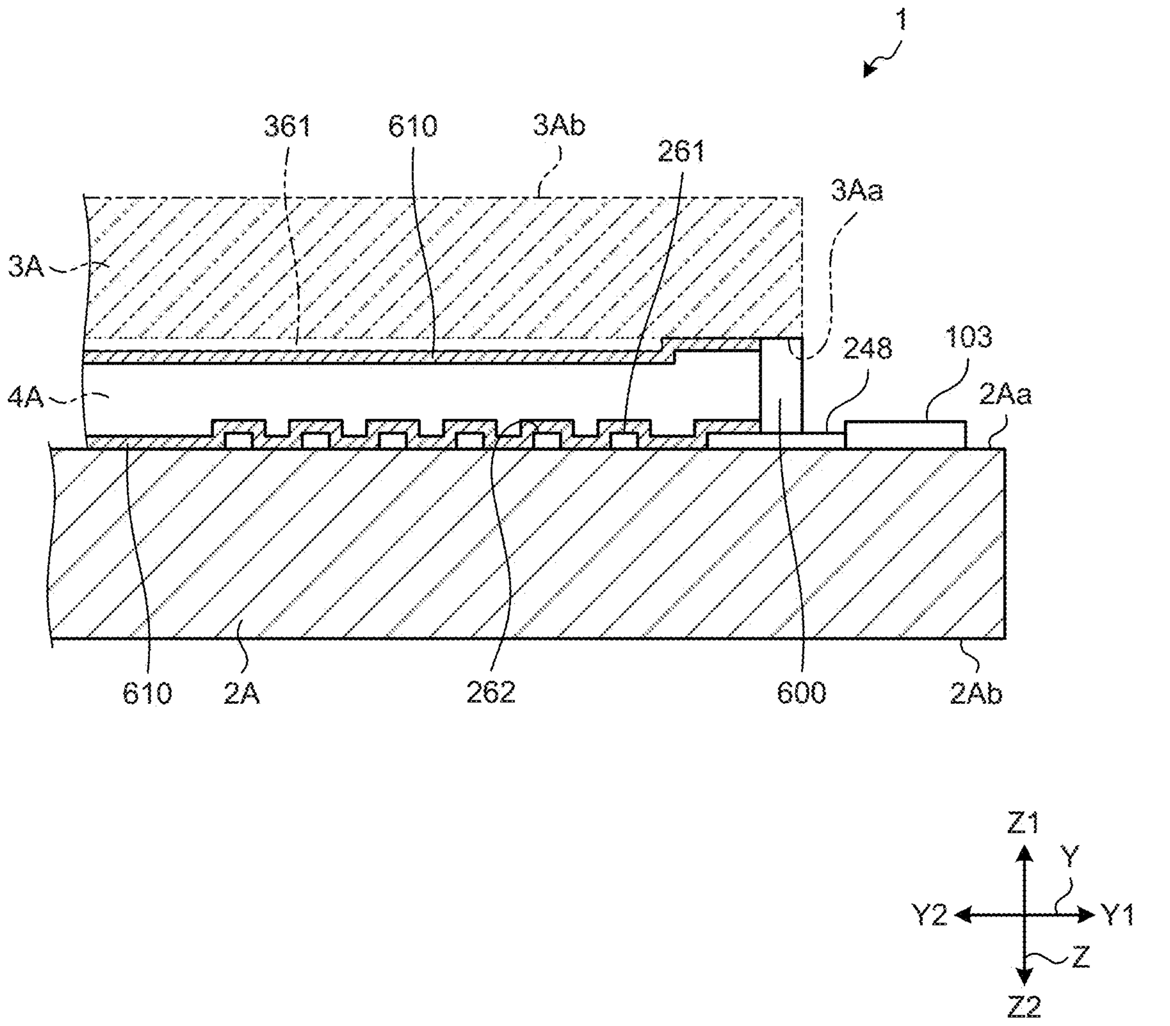
FIG. 9 is a sectional view along IX-IX in FIG. 7.

FIG. 6 is a schematic diagram of the liquid crystal panel when viewed from the front side. FIG. 7 is a schematic diagram illustrating the front surface of a first substrate included in the liquid crystal panel. FIG. 8 is a schematic diagram of a second substrate included in the liquid crystal panel when turned over, illustrating its front surface on which wiring is provided. FIG. 9 is a sectional view along IX-IX in FIG. 7.

As illustrated in FIG. 6, the liquid crystal panel 1 includes a first substrate 2A, and a second substrate 3A disposed on the Z1 side of the first substrate 2A. The liquid crystal panel 1 is a regular octagon in plan view and has a first side 11, a second side 12, a third side 13, a fourth side 14, a fifth side 15, a sixth side 16, a seventh side 17, and an eighth side 18. In the present disclosure, the outer shape of the liquid crystal panel 1 is not particularly limited, and polygons other than the octagon as well as circles and ellipses are included in the present disclosure. In the present embodiment, liquid crystal panels 1 stacked in the Z direction (axial direction) are the four liquid crystal panels 1 having the same configuration. However, two liquid crystal panels 1 adjacent to each other in the Z direction (axial direction) are stacked in states of being relatively rotated by 90° (degrees) about the central axis AX illustrated in FIG. 6. Specifically, the four liquid crystal panels 1 are stacked as a liquid crystal panel for p-wave polarization, a liquid crystal panel for s-wave polarization, a liquid crystal panel for p-wave polarization, and a liquid crystal panel for s-wave polarization in this order in the axial direction.

The first side 11 is positioned on the Y1 side on each liquid crystal panel 1. The first side 11 is parallel to the X direction in the drawing. The first side 11 of the liquid crystal panel 1 matches a first side 211 of the first substrate 2A illustrated in FIG. 7. However, a first side 311 of the second substrate 3A illustrated in FIG. 8 is positioned on the Y2 side relative to the first side 211 of the first substrate 2A. Thus, as illustrated in FIG. 6, an end part 2Ac of the first substrate 2A on the Y1 side is exposed when the second substrate 3A is stacked on the front side of the first substrate 2A. A first terminal group 10 is provided at the end part 2Ac.

The second side 12 is positioned on the X1 side on the liquid crystal panel 1. The second side 12 is parallel to the Y direction in the drawing. The second side 12 of the liquid crystal panel 1 matches a second side 212 of the first substrate 2A illustrated in FIG. 7. However, a second side 312 of the second substrate 3A illustrated in FIG. 8 is positioned on the X2 side relative to the second side 212 of the first substrate 2A. Thus, as illustrated in FIG. 6, an end part 2Ad of the first substrate 2A on the X1 side is exposed when the second substrate 3A is stacked on the front side of the first substrate 2A. A second terminal group 20 is provided at the end part 2Ad.

The third side 13 intersects both the X1 direction and the Y1 direction. The angle of the intersection is 45°. The third side 13 matches a third side 213 of the first substrate 2A illustrated in FIG. 7. However, a third side 313 of the second substrate 3A illustrated in FIG. 8 is positioned on the X2 and Y2 sides relative to the third side 213 of the first substrate 2A. In other words, in plan view, the third side 313 of the second substrate 3A is positioned on the center side relative to the third side 213 of the first substrate 2A. Thus, as illustrated in FIG. 6, an end part 2Ae of the first substrate 2A is exposed when the second substrate 3A is stacked on the front side of the first substrate 2A.

The fourth side 14 intersects both the X1 direction and the Y2 directions. The angle of the intersection is 45°. The fourth side 14 overlaps a fourth side 214 of the first substrate 2A illustrated in FIG. 7 and a fourth side 314 of the second substrate 3A illustrated in FIG. 8.

The fifth side 15 is positioned on the Y2 side on the liquid crystal panel 1. The fifth side 15 overlaps a fifth side 215 of the first substrate 2A illustrated in FIG. 7 and a fifth side 315 of the second substrate 3A illustrated in FIG. 8.

The sixth side 16 intersects both the X2 direction and the Y2 direction. The angle of the intersection is 45°. A sixth side 16 overlaps a sixth side 216 of the first substrate 2A illustrated in FIG. 7 and a sixth side 316 of the second substrate 3A illustrated in FIG. 8.

The seventh side 17 is positioned on the X2 side on the liquid crystal panel 1. The seventh side 17 overlaps a seventh side 217 of the first substrate 2A illustrated in FIG. 7 and a seventh side 317 of the second substrate 3A illustrated in FIG. 8.

The eighth side 18 intersects both the X2 direction and the Y1 direction. The angle of the intersection is 45°. The eighth side 18 overlaps an eighth side 218 of the first substrate 2A illustrated in FIG. 7 and an eighth side 318 of the second substrate 3A illustrated in FIG. 8.

Accordingly, the area of the second substrate 3A is smaller than the area of the first substrate 2A, and thus the first terminal group 10 provided at the end part 2Ac of the first substrate 2A and the second terminal group 20 provided at the end part 2Ad are exposed. The first terminal group 10 or the second terminal group 20 is the terminal part 150 illustrated in FIG. 3. The first terminal group 10 or the second terminal group 20 is electrically coupled to the above-described FPCs 110.

The following describes the first substrate 2A and the second substrate 3A with reference to FIGS. 7 and 8. FIG. 8 is a schematic diagram illustrating a front surface 3Aa on which wiring is provided among the front and back surfaces of the second substrate 3A. Accordingly, the X1 and X2 directions of the second substrate 3A in FIG. 8 are opposite the X1 and X2 directions of the first substrate 2A in FIG. 7. FIG. 7 illustrates a central line CL1 extending in the Y direction through the center of the first substrate 2A in the X direction, and a central line CL2 extending in the X direction through the center of the first substrate 2A in the Y direction. As illustrated in FIG. 7, at the end part 2Ac along the first side 211 of the first substrate 2A, the first terminal group 10 is provided at a first end part 21A (illustrated with dashed and double-dotted lines) on a side closer to the second side 212 (or side closer to the third side 213) with respect to the center of the first side 211. In other words, the end part 2Ac is an end part of the first substrate 2A on the Y1 side, and the first end part 21A illustrated with dashed and double-dotted lines is disposed on the X1 side beyond the central line CL1 among sites of the end part 2Ac. The first terminal group 10 is provided at the first end part 21A. As illustrated in FIG. 7, the first terminal group 10 includes a first terminal 101, a second terminal 102, a third terminal 103, and a fourth terminal 104. The first terminal 101, the second terminal 102, the third terminal 103, and the fourth terminal 104 are sequentially arranged in the X direction from the X1 side toward the X2 side. The terminals 101, 102, 103, and 104 each have a pair of short sides 105 parallel to the first side 211 and a pair of long sides 106 parallel to the second side 212.

As illustrated in FIG. 7, at the end part 2Ad along the second side 212 of the first substrate 2A, the second terminal group 20 is provided at a second end part 22A (illustrated with dashed and double-dotted lines) on a side closer to the first side 211 (or side closer to the third side 213) with respect to the center of the second side 212. In other words, the end part 2Ad is an end part of the first substrate 2A on the X1 side, and the second end part 22A illustrated with dashed and double-dotted lines is disposed on the Y1 side beyond the central line CL2 among sites of the end part 2Ad. The second terminal group 20 is provided at the second end part 22A. As illustrated in FIG. 7, the second terminal group 20 includes a fifth terminal 201, a sixth terminal 202, a seventh terminal 203, and an eighth terminal 204. The fifth terminal 201, the sixth terminal 202, the seventh terminal 203, and the eighth terminal 204 are sequentially arranged in the front-back direction (the Y direction) from the Y1 side toward the Y2 side. The terminals 201, 202, 203, and 204 each have a pair of long sides 107 parallel to the first side 211 and a pair of short sides 108 parallel to the second side 212.

The following describes wiring on the first substrate 2A and the second substrate 3A. Wiring is provided on the front surface of each substrate among the front and back surfaces thereof. In other words, a surface on which wiring is provided is referred to as the front surface, and a surface opposite to the front surface is referred to as the back surface.

As illustrated in FIG. 7, wiring, liquid crystal drive electrodes, and couplers are provided on a front surface 2Aa of the first substrate 2A. A coupler C1 of the first substrate 2A and a coupler C3 (refer to FIG. 8) of the second substrate 3A are electrically coupled to each other through a conductive pole (not illustrated) through which conduction is possible. Similarly, a coupler C2 of the first substrate 2A and a coupler C4 (refer to FIG. 8) of the second substrate 3A are electrically coupled to each other through a common electrode (not illustrated) through which conduction is possible.

The first terminal 101 and the fifth terminal 201 are electrically coupled to each other through a wiring 241. A bifurcation point 242 is provided halfway through the wiring 241, and a wiring extends from the bifurcation point 242 to the coupler C1.

The second terminal 102 and the sixth terminal 202 are electrically coupled to each other through wirings 243 and 245. A bifurcation point 244 is provided on the wiring 243, and a wiring 246 extends from the bifurcation point 244 to an end 247.

The third terminal 103 and the seventh terminal 203 are electrically coupled to each other through a wiring 248. The fourth terminal 104 and the eighth terminal 204 are electrically coupled to each other through wirings 249 and 251. The wiring 249 extends up to a bifurcation point 250 from the fourth terminal 104 toward the X2 side. The wiring 251 extends from the bifurcation point 250 to the eighth terminal 204. A wiring extends from the bifurcation point 250 to the coupling portion C2.

A plurality of liquid crystal drive electrodes 261 are coupled to the wirings 243 and 246. The liquid crystal drive electrodes 261 extend straight in the X direction. The liquid crystal drive electrodes 261 are disposed at equal intervals in the Y direction.

A plurality of liquid crystal drive electrodes 262 is coupled to the wiring 248. The liquid crystal drive electrodes 262 extend straight in the X direction. The liquid crystal drive electrodes 262 are disposed at equal intervals in the Y direction. The liquid crystal drive electrodes 261 and 262 are alternately arranged in the Y direction.

As illustrated in FIG. 8, wirings, liquid crystal drive electrodes, and coupling portions are provided on the front surface 3Aa of the second substrate 3A. The central lines CL1 and CL2 illustrated in FIG. 8 correspond to the central lines CL1 and CL2 illustrated in FIG. 7.

The coupling portion C3 is coupled to wirings 342 and 343 through a bifurcation point 341. The wiring 342 extends to an end 348. The wiring 343 extends to an end 349. The coupling portion C4 is coupled to wirings 345 and 346 through a bifurcation point 344. The wiring 346 extends to an end 347.

A plurality of liquid crystal drive electrodes 361 are coupled to the wirings 342 and 343. The liquid crystal drive electrodes 361 extend straight in the Y direction. The liquid crystal drive electrodes 361 are disposed at equal intervals in the X direction.

A plurality of liquid crystal drive electrodes 362 is coupled to the wiring 346. The liquid crystal drive electrodes 362 extend straight in the Y direction. The liquid crystal drive electrodes 362 are disposed at equal intervals in the X direction. The liquid crystal drive electrodes 361 and 362 are alternately arranged in the X direction.

The following briefly describes a sectional structure of each liquid crystal panel 1. FIG. 9 is a sectional view along line IX-IX in FIG. 7. As illustrated in FIG. 9, the liquid crystal panel 1 includes the first substrate 2A, the second substrate 3A, and a liquid crystal layer 4A. As illustrated in FIG. 9, the second substrate 3A is disposed on the front side (the Z1 side) of the first substrate 2A. The liquid crystal layer 4A is provided between the second substrate 3A and the first substrate 2A. Specifically, the front surface 2Aa of the first substrate 2A and the front surface 3Aa of the second substrate 3A face each other with the liquid crystal layer 4A interposed therebetween. The first substrate 2A has a back surface 2Ab opposite the front surface 2Aa, and the second substrate 3A has a back surface 3Ab opposite the front surface 3Aa. Since the area of the second substrate 3A is smaller than the area of the first substrate 2A as described above, the third terminal 103 provided on the front surface 2Aa of the first substrate 2A is exposed. An insulating layer is provided to prevent contact between two wiring. In the liquid crystal panel 1 according to the present embodiment, however, the insulating layer is not provided because there is no portion where the wiring on the first substrate 2A overlap each other.

In addition, alignment films 610 are stacked on both substrates and the electrodes as illustrated in FIG. 9. Specifically, one of the alignment films 610 is stacked on the front surface 2Aa of the first substrate 2A and the upper surfaces of the liquid crystal drive electrodes 261 and 262, and part of the wiring 248. The other alignment film 610 is stacked on the front surface 3Aa of the second substrate 3A and the upper surface of the liquid crystal drive electrode 361. The first substrate 2A and the second substrate 3A are bonded to each other by a seal 600 enclosing an effective region, and the liquid crystal layer 4A fills a space formed by the seal 600.

The following easily describes effects of each liquid crystal panel 1. For example, when voltage is applied to the liquid crystal panel 1, the alignment state of liquid crystal molecules in the liquid crystal layer 4A illustrated in FIG. 9 changes, which changes refractive index distribution, thereby diffusing transmitted light. In FIG. 7, light diffuses in the Y direction when current flows to the liquid crystal drive electrodes 261 and 262 extending in the X direction to provide potential difference between the liquid crystal drive electrodes 261 and 262. In FIG. 8, light diffuses in the X direction when current flows to the liquid crystal drive electrodes 361 and 362 extending in the Y direction to provide potential difference between the liquid crystal drive electrodes 361 and 362. Light is diffused in the X and Y directions by providing the potential difference between the liquid crystal drive electrodes 261 and 262 and the potential difference between the liquid crystal drive electrodes 361 and 362. The degree of light diffusion in the Y direction can be changed by increasing or decreasing the potential difference between the liquid crystal drive electrodes 261 and 262. Moreover, the degree of light diffusion in the X direction can be changed by increasing or decreasing the potential difference between the liquid crystal drive electrodes 361 and 362.

As described above, the illumination device 100 according to the present embodiment includes the heat sink 6, the LED 4 disposed on the D1 side of the heat sink 6 and configured to be cooled by the heat sink 6, the reflector 3 disposed on the D1 side of the LED 4, and a first attachment member 130 attaching the LED 4 and the reflector 3 to the heat sink 6.

As described above, in a case where there is a plurality of attachment members to which components of an illumination device are attached, it can be assumed that, to one main attachment member, the other attachment members are coupled. With this configuration, loads concentrate on the one attachment member. Specifically, loads applied to all attachment members are not averaged but concentrate on a particular attachment member and the stiffness of the particular attachment member needs to be increased, and thus the configuration is not preferable.

In the present embodiment, the LED 4 and the reflector 3 are attached to the heat sink 6 through the first attachment member 130. Accordingly, loads on the LED 4 and the reflector 3 are supported not by only the first attachment member 130 but by both the first attachment member 130 and the heat sink 6. Specifically, loads on the LED 4 and the reflector 3 are input to the first attachment member 130, and since the first attachment member 130 is attached to the heat sink 6, the loads are borne by both the first attachment member 130 and the heat sink 6. Accordingly, load concentration on a particular attachment member is prevented when there is a plurality of attachment members to which components of the illumination device 100 are attached, and the stiffness of the first attachment member 130 can be set to be smaller.

The first attachment member 130 includes the elongated members 73 extending in the axial direction outside the heat sink 6, the first holder 72 assembled outside the elongated members 73, and the second holder 5 assembled on the D1 side of the elongated members 73 and disposed on the D1 side of the heat sink 6, the LED 4 and the reflector 3 being attached to the second holder 5.

In this manner, the first holder 72 with a ring shape and the elongated members 73 are disposed on the outer periphery of the heat sink 6. Thus, encumbrance of heat-releasing with the heat sink 6 is reduced as compared to a case where, for example, a tubular holder covers the outer periphery of the heat sink 6. Moreover, since the second holder 5 is assembled to the elongated members 73, the LED 4 and the reflector 3 can be attached to the heat sink 6 with simple structures.

The LED 4 is sandwiched between the second holder 5 and the heat sink 6. Thus, the LED 4 can be attached with simple configurations. Moreover, the LED 4 can contact the heat sink 6 with simple configurations.

The first attachment member 130 includes the third holder 71 disposed on the D2 side of the heat sink 6, and the elongated members 73 and the heat sink 6 are attached to the third holder 71. With this configuration, the relative distance from the elongated members 73 to the heat sink 6 in the axial direction can be fixed by the third holder 71.

The heat sink 6 includes the body part 61 with a column shape having the central axis AX extending in the axial direction, and the fins 62 extending outward in the radial direction and in the axial direction from the outer peripheral surface of the body part 61. The fins 62 include the first fins 62A having the first height from the outer peripheral surface of the body part 61, and the second fins 62B having a height lower than the first height from the outer peripheral surface of the body part 61. The elongated members 73 are disposed outside the second fins 62B in the radial direction.

In this manner, since the elongated members 73 are disposed outside the second fins 62B with low heights in the radial direction, the outer diameter of the illumination device 100 can be reduced as compared to a case where the elongated members 73 are disposed outside the first fins 62A in the radial direction.

The liquid crystal panels 1 are provided on the D1 side of the reflector 3 and attached to the first holder 72 of the first attachment member 130 through the holder (second attachment member) 2.

With this configuration, the liquid crystal panels 1 can be easily attached to the first attachment member 130. In this manner, attachment loads on the LED 4, the reflector 3, and the liquid crystal panels 1 are dispersed to both the first attachment member 130 and the heat sink 6, and thus the stiffness of the first attachment member 130 and the second attachment member can be set to be smaller.

The distance from the LED 4 to the liquid crystal panels 1 in the axial direction when the protrusions 724 are fitted to the first recessed part 732A is the first distance. The distance from the LED 4 to the liquid crystal panels 1 in the axial direction when the protrusions 724 are fitted to the second recessed part 732B is the second distance. The first distance is longer than the second distance. In this manner, the distance from the LED 4 to the liquid crystal panels 1 can be increased by selecting the first recessed part 732A as a recessed part 732 to which the protrusions 724 of the first holder 72 are fitted, and the distance from the LED 4 to the liquid crystal panels 1 can be decreased by selecting the second recessed part 732B as a recessed part 732 to which the protrusions 724 are fitted.

The control board 8 configured to control the LED 4 and the liquid crystal panels 1 is disposed on the D2 side of the heat sink 6, and the LED 4, the liquid crystal panels 1, and the control board 8 are electrically coupled to one another through the FPCs 110 and the wiring 120.

The LED 4 and the liquid crystal panels 1 are disposed on the D1 side of the heat sink 6. Accordingly, when the control board 8 is disposed on the D1 side of the heat sink 6, the control board 8 needs to be disposed, for example, outside the LED 4 or the liquid crystal panels 1 in the radial direction, and therefore, the size of the illumination device 100 can be increased. Thus, it is possible to prevent size increase of the illumination device 100 by disposing the control board 8 on a side opposite the LED 4 and the liquid crystal panels 1 with the heat sink 6 interposed therebetween.

What is claimed is:

1. An illumination device comprising:
a heat sink;
a light source disposed on one side of the heat sink in a first direction and configured to be cooled by the heat sink;
an optical member disposed on the one side of the light source in the first direction; and
a first attachment member attaching the light source and the optical member to the heat sink, wherein
the first attachment member includes
an elongated member extending in the first direction outside the heat sink and having a fixed relative position to the heat sink in the first direction,
a first holder assembled outside the elongated member, and
a second holder assembled on the one side of the elongated member in the first direction and disposed on the one side of the heat sink in the first direction, the light source and the optical member being attached to the second holder, and
an optical element is provided on the one side of the optical member in the first direction and attached to the first holder of the first attachment member through a second attachment member.

2. The illumination device according to claim 1, wherein
the first attachment member includes a third holder disposed on another side of the heat sink in the first direction, and
the elongated member and the heat sink are attached to the third holder.

3. The illumination device according to claim 1, wherein
the optical element includes a plurality of liquid crystal panels stacked in the first direction, and in the liquid crystal panels, a liquid crystal panel for p-wave polarization and a liquid crystal panel for s-wave polarization are alternately stacked in the first direction.

4. The illumination device according to claim 1, wherein a control board configured to control the light source and the optical element is disposed on an another side of the heat sink in the first direction, and the light source and the optical element are electrically coupled to the control board through wiring.

* * * * *